United States Patent [19]

Hohl et al.

[11] 3,877,283

[45] Apr. 15, 1975

[54] WELD BEAD-REDUCING APPARATUS

[75] Inventors: Francis R. Hohl, Union; Arthur L. Meyer, Jr., Kendall Park; Robert W. Faust, Mantoloking, all of N.J.

[73] Assignee: Carpenter Technology Corporation, Reading, Pa.

[22] Filed: Aug. 21, 1973

[21] Appl. No.: 390,312

[52] U.S. Cl. .................. 72/398; 29/481; 72/76; 72/193
[51] Int. Cl. ..................... B21j 7/04; B21j 7/28
[58] Field of Search ........ 29/33 A, 481; 72/76, 193, 72/208, 209, 370, 452, 398; 90/24 B

[56] References Cited
UNITED STATES PATENTS

| | | | |
|---|---|---|---|
| 1,215,773 | 2/1917 | Butcher | 29/481 X |
| 2,025,421 | 12/1935 | Rippel | 29/33 A |
| 2,712,249 | 7/1955 | Siegerist | 29/481 X |
| 3,494,165 | 2/1970 | Preusch | 72/193 |
| 3,577,756 | 5/1971 | Cramer | 72/193 |

Primary Examiner—C. W. Lanham
Assistant Examiner—E. M. Combs
Attorney, Agent, or Firm—Edgar N. Jay

[57] ABSTRACT

Apparatus for reducing the internal weld bead of welded tubing. An anvil plug is mounted so as to be omni-directionally movable to a limited extent within continuously formed and welded tubing downstream from the welding station. The tubing passes between a pair of upper and lower dies which embrace the tube at the location of the anvil plug. The upper die is hammer-displaceable toward the other to rapidly and successively deflect the tube wall into bead-reducing contact with the anvil plug as the tube advances.

8 Claims, 3 Drawing Figures

3,877,283

3,877,283

WELD BEAD-REDUCING APPARATUS

BACKGROUND OF THE INVENTION

This invention relates to apparatus for finishing welded tubing, and, more particularly, to new and improved apparatus for reducing the internal weld bead formed in continuously produced thin wall welded tubing.

Heretofore, several approaches have been made to produce apparatus for use in reducing the internally projecting portions of the weld bead in the desired manner, but most such prior devices or machines have been unduly complicated and have left much to be desired.

For example, as disclosed in U.S. Pat. No. 2,712,249, a plug or anvil is rigidly connected to and located by a cable which is described as being resiliently stretchable so that when the anvil plug is released from being clamped to the continuously advancing tubing the cable returns the anvil plug to its starting position. The internal weld bead is hammered flat as the tubing passes through the machine by a pair of hammers mounted on opposite sides of the path of the tubing and actuated by rollers mounted in an annular array circumferentially about a pulley which encloses the hammers and has its center of rotation on the axis of the tubing. Because of the concentric arrangement about the tubing of the pulley, with its peripheral rollers and the hammers actuated by the rollers, repair or replacement of the hammers or other parts which wear in normal operation is time consuming. And because the internal anvil or plug is biased to a definite position, it and the parts connected to it such as the cable are susceptible to undue wear and failure.

U.S. Pat. No. 3,494,165 discloses an apparatus in which a plug is axially located within the tubing downstream from the welding station. The plug has a diameter portion in contact with the internal weld bead and the opposite internal surface of the tubing. An externally mounted eccentrically driven wheel is provided for repeatedly applying a compressive force to the tubing adjacent to the plug that causes the plug to move a short distance within the tube. The plug is spring biased and when it is released by relaxation of the compressive force, it is returned to its original position. It is this reciprocation of the plug within the tubing which is described as removing the internal weld bead. It is evident that such an arrangement is characterized by undesirable wear particularly in connection with the eccentric drive and the contact fit between the plug and tube.

In such apparatus, the use of flexible cables to bias the internal plug used in finishing small diameter tubing results in rapid fatigue and failure of the cable. And when the plug is spring biased so as to shift it upstream before the start of compression of the tubing, the springs tend to rapidly work harden and often fail, requiring frequent replacement as was found to be the case with flexible cables.

SUMMARY OF THE INVENTION

The present invention stems from the unexpected discovery that the foregoing problems are largely eliminated and enhanced trouble-free operation is provided by supporting the internal anvil plug within the tubing so that it is omni-directionally movable with respect to its support and substantially also with respect to the tubing while the latter is fed continuously, except for that time when an external hammer is actuated to compress the wall of the tubing against the plug and thereby reduce the internal weld bead by hammering the same.

In carrying out a preferred embodiment of the present invention, the weld bead-reducing apparatus, which is for use in a production line for the high speed welding of strip to form small diameter tubing, is located downstream of the welding station so that a plug, preferably made of hard, wear-resistant material such as tungsten carbide, is enclosed by the newly formed and welded tubing. Means are provided externally of the tubing including a reciprocally mounted hammer means for periodically striking the tubing with the weld bead to be reduced between the plug and the hammer means. An important feature of the present invention resides in the provision of means for locating the plug in the tubing with respect to the hammer means while leaving the plug free to move omni-directionally relative to both of them. Consequently, the impact of the rapid blows administered to the tubing, causes the plug to move randomly and to rotate in the restricted space provided relative to the hammer means.

DESCRIPTION OF THE DRAWINGS

Further objects as well as advantages of the present invention will be apparent from the following detailed description of a preferred embodiment and the accompanying drawing in which.

Figure 1:
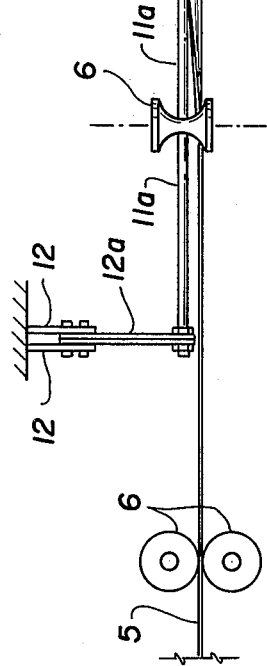
FIG. 1 is a diagrammatic side elevational view, partly in section, of a production line for continuously forming and welding metal tubing and shows a preferred form of weld bead-reducing apparatus constructed in accordance with this invention.

Referring to the drawings in detail, a welded tubing production line is illustrated in FIG. 1 in which a continuous flat strip 5 of metal is passed between the nips of successive feeding and forming rolls schematically indicated at 6 and formed into a tube 7 of generally circular cross-section after which the opposed free edges of the tube are welded at a welding station schematically indicated at 8. Conventional welding techniques result in an internally protruding bead 9 which though relatively small is objectionable. The weld bead-reducing apparatus 10 of the present invention serves to reduce the protuberant internal weld bead 9 by redistributing the metal of which it is made to provide a substantially smooth inner wall surface.

The bead-reducing apparatus 10 includes an axial rod or mandrel 11 that fits freely within the tube 7 and has its upstream end connected to a tube 11a which in turn is connected to an anchor assembly 12 located upstream of the zone of tube formation.

The downstream end of the rod 11 extends downstream of the welding station 8 in the zone where the internal head 9 is to be reduced and is provided with a generally cylindrical upstream guide plug 13 having a diameter somewhat less than the nominal inside diameter of the tube 7 as measured from the inner face of the bead 9 to the opposite wall of the tube in order that the tube may be freely movable axially with respect thereto. A nut 14 and associated washer 15 together form an upstream abutment for the guide plug 13. A complementary centering or guide plug 16 is carried by the rod 11 in spaced relation to and downstream of the plug 13 and a nut 17 and associated washer 18 fixed adjacent to the free downstream end of the rod 11 forms a downstream abutment for the guide plug 16. Preferably, the plugs 13 and 16 are formed from a plastic material having a low coefficient of friction such as a polyfluoroethylene or a polytetrafluoroethylene compound commercially available under the trademark "Teflon."

A substantially cylindrical anvil plug 19 having a tapered upstream end 20 is formed from tungsten carbide or other hard metal alloy and freely fitted on the rod 11 intermediate the centering plugs 13 and 16. Abutment washers 21 also may be movably mounted on the rod 11 adjacent the ends of the anvil plug 19 if desired.

Anvil plug 19 has a central, axial bore 22, the diameter of which is sufficiently larger than the diameter of rod 11 to provide radial clearance with respect to the rod 11 so that the anvil plug 19 is free to move radially a limited distance in any radial direction with respect to the interior of tubing 7. The outside diameter of the cylindrical portion of the anvil plug 19 is comparable to that of the guide plugs 13 and 16 and is substantially less than the diameter of tubing 7 measured from the internal bead 9 to a point 180° opposite on the wall of the tubing 7 so that the anvil plug 19 is free to move radially within the tube 7. With the guide plugs 13 and 16 up against their respective washers 15 and 18 and the abutment washers 21 each against the associated guide plug, the spacing between the abutment washers 21 is such that the anvil plug 19 is free to move axially a limited distance along the rod 11 between the abutment washers. The extent to which the anvil plug is axially movable between washers 21 can be varied by appropriate adjustments of either or both of the nuts 14 and 17.

Figure 3:
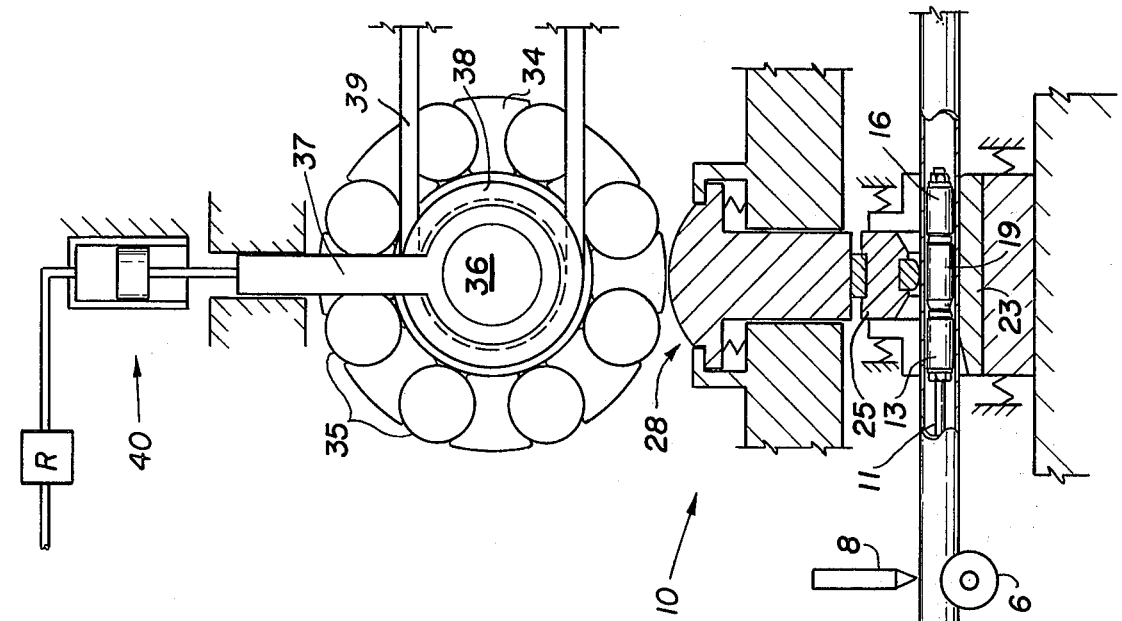
FIG. 3 is a vertical transverse sectional view taken along line 3—3 of FIG. 2.
Figure 3:
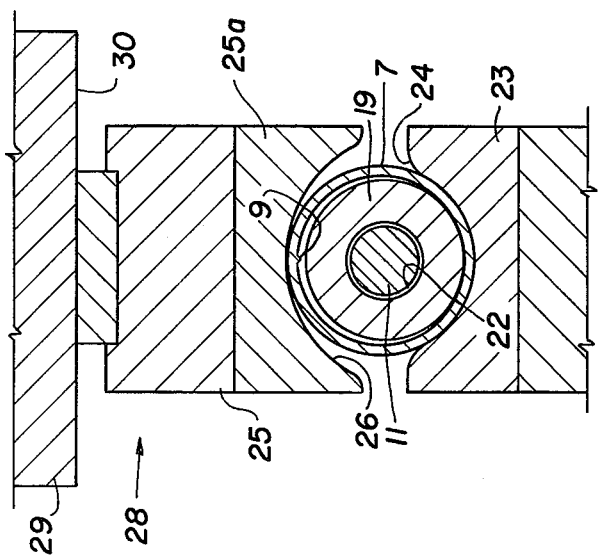

A bottom die 23 is positioned along the feedpath for the tubing 7 in opposition to the anvil plug 19 to receive a portion of the newly formed tubing in an upwardly presented channel 24 (FIG. 3) formed therein. Channel 24 has a transverse curvature which conforms substantially to that of the outer wall of the tube 7 while minimizing frictional drag between the tube 7 and the bottom die 23.

A top die 25 is mounted above the tube 7 opposite anvil plug 19 and for coaction with the latter and bottom die 23. The top die 25 is preferably formed with a removably mounted insert 25a formed of hard, wearresistant material such as tungsten carbide, which forms the working surface of die 25. The curvature of surface 25a transverse to tubing 7 is slightly greater than that of the outside of tubing 7. For example for tubing having an outer diameter of about 0.9 inch, a radius of curvature about 1/16th inch greater for the surface 25a, as viewed in FIG. 3 coupled with a curvature as viewed in FIG. 2 to give axial contact of about one-eighth inch provides a contact area between surface 25a and tubing 7 of about ⅛ inch × ⅛ inch.

Bottom die 23 and top die 25 are each biased horizontally as indicated diagrammatically by springs 27 and, as will be more fully pointed out hereinafter are free to move horizontally a limited extent. Top die 25 is free to move up and down and, when driven downward, its working surface coacts with the anvil plug 19 to reduce the internal weld bead of the tubing 7.

A hammer 28 is mounted for vertical reciprocation above the top die 25 and has a bottom face 30 disposed in opposition to the upper face of the top die 25. Hammer 28 has a convex head 31 provided with an annular shoulder 32. Compression springs 33 are interposed between the shoulder 32 and the associated hammer guideway and bias the hammer 28 upwardly to return it for contact with impact producing elements, as will be hereinafter more fully described.

A power driven wheel or cylinder 34 is mounted above the hammer 28 for rotation on a shaft 36 which conveniently extends transverse to tubing 7. Wheel 34 has a plurality of equally spaced impact rollers 35, 8 as shown, rotatably mounted about its periphery with the surface of each roller 35 projecting radially beyond the rim of the wheel 34 for successive impact-producing contacts with the convex head 31 of the hammer 28. Shaft 36 is mounted in a supporting frame 37 which can be provided with a conventional rigid screw-down means for reaction to the successive impacts of the rollers 35 against the hammer 28. However, such arrangements have been found to lead to malfunctions whenever, due to accumulations of metal or for other reasons, wheel 34 is prevented from rotation with one of the rollers 35 against and unable to pass hammer 28. Preferably, as shown diagrammatically in FIG. 1, pneumatic hold-down means 40 are provided for positioning frame 37 and shaft 36 with the pressure adjusted to permit shaft 36 to move away from the hammer 28 when necessary to avoid jamming and buckling of the tubing 7. A pulley 38 mounted on shaft 36 and rotated by belts 39 provides a suitable drive for the weld bead-reducing apparatus 10.

In operation, tubing 7 is continuously advanced at a substantially uniform speed past the anvil plug 19 and its associated bead-reducing elements. At the same time, rotation of the wheel 34 causes the rollers 35 thereof to rapidly, successively impact against hammer 28 thereby imparting repetitive downward movements to the hammer 28 so that the stud or ram of the hammer transmits corresponding impact forces and vertical motion to the top die 25. The top die 25 in turn forces a corresponding downward deflection of the wall of tubing 7, having the internal weld bead, into beadreducing contact with the anvil plug 19. It is seen that the anvil plug being free to move vertically is forced against the bottom portion of the horizontal tubing 7 and the latter is in turn supported on the bottom die 23.

As each impact from successive rollers 35 is thus transmitted, there occurs a momentary clamping together of anvil plug 19, bottom die 23, and top die 25 with the advancing tube 7. Those parts advance axially with the tube for the momentary duration of each such clamping action. The bottom and top dies 23, 25 being spring biased are returned to their normal positions between successive impacts.

Figure 2:
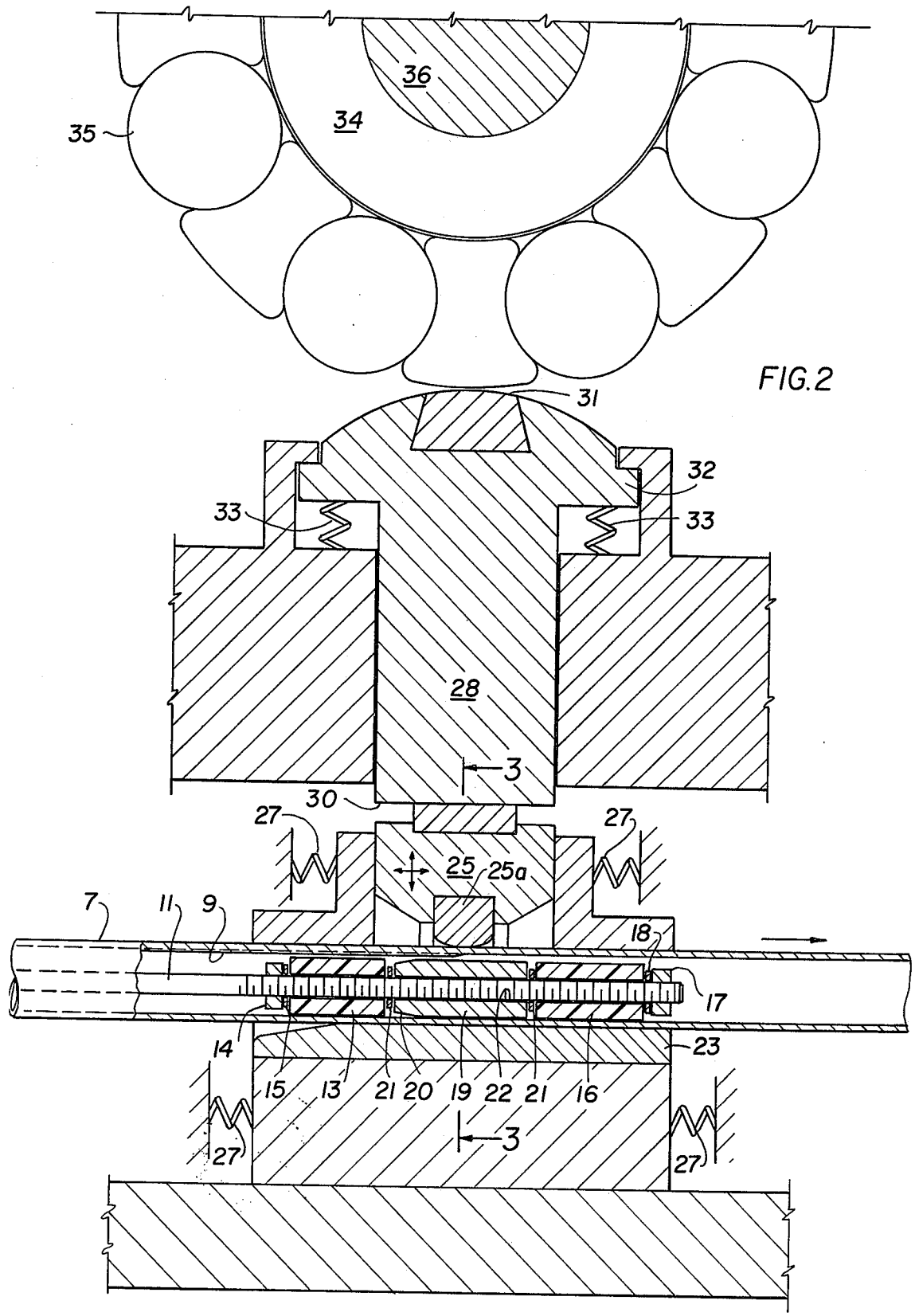
FIG. 2 is a vertical sectional view, partly diagrammatic, showing the weld bead-reducing apparatus on an enlarged scale.

In the illustrated embodiment of the invention, the bottom die 23 is shown as being spring biased. However, bottom die 23 could be fixed horizontally thus requiring the tube 7 to be frictionally advanced therealong, particularly during the interval when the parts are clamped. However, regardless of whether or not the bottom die is fixedly mounted or resiliently mounted for sequential axial or longitudinal movements with the tube, the inward deflection of the tube wall and its weld bead into beadreducing contact with the anvil plug 19 causes the anvil plug 19 to strike the downstream abutment washer 21. This impact is transmitted through the downstream guide plug 16, which absorbs some of the shock, to the rod 11 through the intervening washer 18 and nut 17. It is important to note that the anvil plug 19, being free to move between the guide plugs 13, 16 and the associated abutment washers 21, only a minor portion, if any, of the horizontal movement of dies 23 and 25 is transmitted to the rod 11. Because the anvil plug is free to move relative to the rod 11 and tube 7 once the latter is free of compressive forces, the anvil plug rebounds from the downstream centering plug 16 and its associated washer and tends to gyrate in the space available. This is evident from, among other things, the width of the annular wear band on the anvil plug 19 which, from left to right as viewed in FIG. 2, is substantially longer than the length of the surface 25a of top die 25 that engages the outer surface of tubing 7. The wear band on the anvil plug 19 is circular and extends entirely about the anvil plug 19 thus making it clear that the anvil plug rotates as it gyrates in operation.

When struck by the ram of hammer 28, the top die 25 is driven vertically downward to deflect the bead-carrying portion of the tube wall into bead-reducing contact with anvil plug 19. During the interval the top die 25 is against the tube wall it is carried downstream along with the bottom die 23 to compress springs 27. The inherent resilience of tubing 7, as well as rebound, serves to drive the top die 23 upward for the next impact by the hammer 28.

In the preferred embodiment described, the combined length of rod 11 and tube 11a was about 10½ feet but despite the inherent ability of such a length of rod and tubing to elongate under stress it is necessary to provide a shock absorber, preferably in the form of flat, resilient members 12a at the anchor 12 to minimize fatigue and breaking of the rod 11 and/or tube 11a. This permits rod 11 and tube 11a to move a limited extent which may in practice vary from about 0.005 to 0.015 inch.

It should also be noted that the tapered upstream end 20 of the anvil plug 19 facilitates continued advance of the tubing 7 over the anvil plug 19. At the same time the relatively longer cylindrical surface of the main portion of the anvil plug 19 provides a long axially extending anvil against which the advancing tube is driven to reduce the internal weld bead.

While the hammer 28 and top die 25 have been described as two separate members, they can be combined into one member if desired or more than two can be provided. When the hammer and top die are combined into one, the arrangement has the disadvantages of being more difficult and requiring more time to service.

It will be understood that although the various dimensions and relative proportions of parts will vary in accordance with the type, diameter and wall thickness of the tubing being fabricated, as well as in accordance with its speed of advance and the number of bead-reducing impacts delivered per unit length of tubing, the relative clearance and relative motions as described above will be maintained. However, outstanding results have been attained using rod 11 and tubing 11a having an outer diameter of about one-fourth inch and of about three-eighths inch, respectively. The axial bore 22 in the anvil plug 19 was about 1/32 inch larger in diameter than the rod 11. The diameter of the cylindrical portion of the anvil plug 19 was about 0.015 inch less than the shortest interior diameter of the tubing 7 as measured between the internal weld bead and a point opposite (before the weld bead has been reduced). Wheel 34 is driven at about 250 to 300 revolutions per minute. And the anvil plug 19 preferably has about 1/32 inch free axial travel between the abutment washers 21.

The feed rate is not critical, but, beyond satisfying the requirements of forming a sound weld, the rate should not exceed that at which successive impacts to the tubing overlap sufficiently to provide the desired reduction of the internal weld bead to a smooth surface. In practice, a feed rate of up to about 200 inches per minute gave outstanding results.

It is, of course, to be understood that variations in arrangements and proportions of parts may be made within the scope of the appended claims. The terms and expressions which have been employed are used as terms of description and not of limitation, and thre is no intention in the use of such terms and expressions of excluding any equivalents of the features shown and described or portions thereof, but it is recognized that various modifications are possible within the scope of the invention claimed.

What is claimed is:

1. Internal weld bead-reducing apparatus for flattening the internal bead formed in welded tubing, comprising an elongated mandrel, means for feeding the tubing along said mandrel with the latter extending longitudinally within the tubing, an elongated anvil having a maximum transverse diameter substantially less than the interior diameter of said tubing and less than the distance between the weld bead in said tubing and the opposite interior surface of said tubing, means positioning said anvil on said mandrel while leaving said anvil free to move a predetermined amount longitudinally along and transversely to said mandrel whereby said anvil is free to move both longitudinally and radially with respect to said tubing between the weld bead and the opposite surface of the tubing, a hammer assembly including a hammer and means supporting the same along one side of said mandrel for moving said hammer to impact the tubing and force a portion of the bead on the interior thereof into beadreducing contact with said anvil.

2. Internal weld bead-reducing apparatus as set forth in claim 1 in which said hammer assembly is positioned on one side of said tubing, and means for supporting the tubing during said impact is positioned on the other side of said tubing.

3. Internal weld bead-reducing apparatus as set forth in claim 1 in which said hammer is cyclically moved a predetermined distance away from said tubing between successive impacts, and said means for supporting said hammer assembly includes quick release means responsive to a predetermined force for permitting said hammer to move away from said tubing beyond said predetermined distance.

4. Internal weld bead-reducing apparatus as set forth in claim 3 in which said quick release means is pneumatic.

5. Internal weld bead-reducing apparatus as set forth in claim 3 in which said anvil is free to rotate about said mandrel between successive impacts.

6. Internal weld bead-reducing apparatus as set forth in claim 5 in which said means positioning said anvil on said mandrel includes a pair of guide plugs on said mandrel spaced from the opposite ends of said anvil.

7. Internal weld bead-reducing apparatus as set forth in claim 6 in which said anvil is substantially cylindrical, one end portion of said anvil being tapered.

8. Internal weld bead-reducing apparatus as set forth in claim 7 in which the rate at which said hammer is cyclically moved and the rate at which the tubing is fed is such that successive areas of said tubing impacted by said hammer overlap.

* * * * *